(No Model.)  2 Sheets—Sheet 1.

T. A. SMITH.
CAR COUPLING.

No. 267,117.   Patented Nov. 7, 1882.

Witnesses,
Geo. H. Strong.
L. H. Nourse.

Inventor,
T. A. Smith
By Dewey & Co.
Attorneys (No Model.) 2 Sheets—Sheet 2.

T. A. SMITH.
CAR COUPLING.

No. 267,117. Patented Nov. 7, 1882.

Witnesses,
Geo. H. Strong
S. H. Nourse

Inventor,
T. A. Smith
By Dewey & Co.
Attorneys

UNITED STATES PATENT OFFICE.

THERON A. SMITH, OF ARBUCKLE, CALIFORNIA.

CAR-COUPLING.

SPECIFICATION forming part of Letters Patent No. 267,117, dated November 7, 1882.

Application filed July 31, 1882. (No model.)

*To all whom it may concern:*

Be it known that I, THERON A. SMITH, of Arbuckle, county of Colusa, State of California, have invented an Improved Car-Coupling; and I hereby declare the following to be a full, clear, and exact description thereof.

My invention relates to an improvement in car-couplings; and it consists mainly in an attachment which may be secured to any ordinary draw-head, and which is provided with a device for holding the pin up until it is released by the approaching link, when it will drop through the latter.

It also consists in a novel construction of the link.

Figure 1:
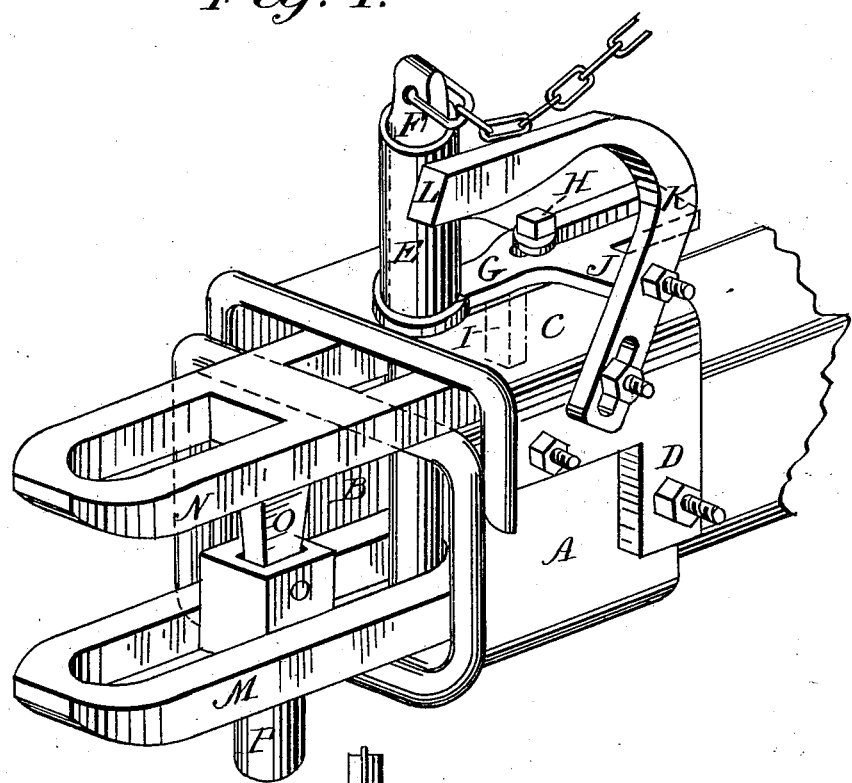
Figure 3:
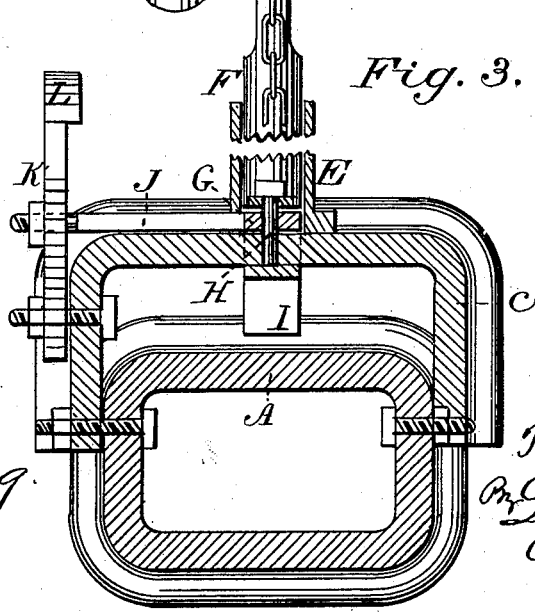
Figure 2:
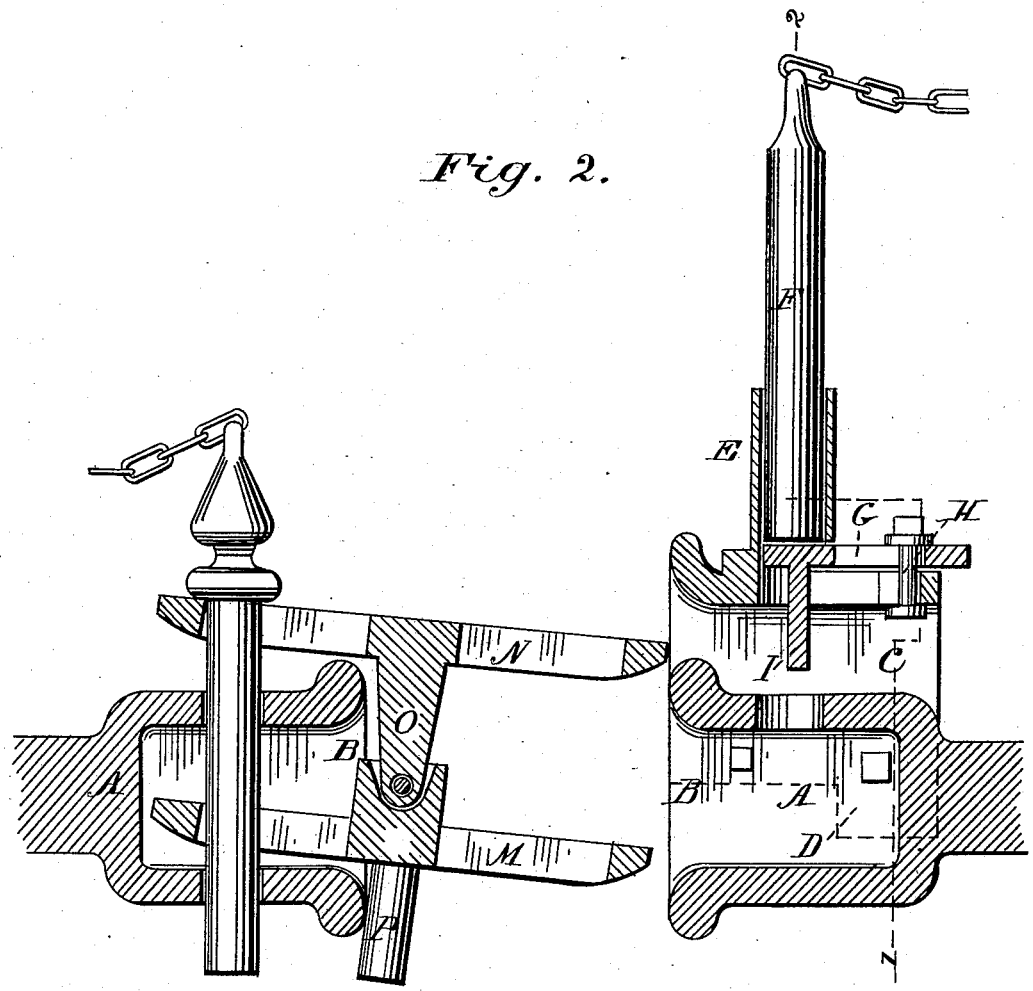

Referring to the accompanying drawings for a more complete explanation of my invention, Figure 1 is a perspective view of my device with only one draw-head shown. Fig. 2 is a longitudinal section, showing link attached to old style of draw-head and uncoupled from my device; Fig. 3, a cross-section on line 1 2, Fig. 2.

My invention is intended for application to the draw-heads of car-couplings already in use; but it may also be constructed independently and complete in itself for new work.

A is a draw-head or bumper, having an opening, B, to receive the coupling-link. Above this draw-head A is fixed an attachment, C, which conforms to the upper part of the draw-head in shape, and may be formed with it or secured to it by means of a bolt passing through the arms D, or in other suitable manner. From the upper part of C a tube, E, extends vertically upward in line above the pin-hole in the head A, and the coupling-pin F is placed in this tube, the lower end resting upon the forward end of a horizontal sliding bar, G, which enters a slot made for the purpose at the bottom of the tube or upon the top of the part C. The rear end of this bar is slotted, and fits over a guide-pin, H, so that it may be moved forward and back in a line. An arm, I, projects below this bar G, so that its lower end is in position to be struck by an approaching link, and it and the bar G will be moved back until the coupling-pin is released and allowed to fall through the link. An arm, J, extends upward from one side of the bar G, and is bent at right angles, or has a pin, so as to enter a hole in the bent lever-arm K, the lower end of which is pivoted to the side of the part C. The free end of this lever extends forward, and has a weight, L, formed upon or fixed to it, so as to bring it down, and thus act upon the sliding bar G to force it forward whenever the pin is removed. It will be manifest that a spring might be used in place of the weight with a similar result.

The link consists of two parts, M and N, having cross-bars at or near the center, and connected by an arm, O, so that one link stands above the other. The lower one will enter the opening B in the draw-head A, while the upper one is at such a height as to enter the space between the top of A and the part C. As these links enter their respective openings the upper one strikes the arm I, which projects down from the bar G, and moves it and the bar back until the coupling-pin F is released and falls through the links, so as to retain them. The arm O, which unites the links, extends downward from the upper link, to which it is fixed, and enters a socket in the lower cross-bar, where it is pinned so as to have some motion, the links being thus not rigidly secured together, but with their ends having some vertical play, which allows them to adjust themselves to variations in the height of the draw-heads, or other slight differences. The lower part of each end of the upper link is also beveled off, so as to incline upwardly to facilitate its entering the opening intended for it. From the bottom of the cross-bar, in the center of the lower link, an extension, P, is made downward, and this rests against the front of the draw-head, to which the link is pinned, so that when approaching another car to be coupled with, the link will always be held in a horizontal position and enter the opposite draw-head properly.

It will be seen that this device may be attached to any of the ordinary draw-heads now in use, or it may be constructed independently for new work. It will connect with any other draw-head made in the ordinary manner, and will in no way interfere with the use of other cars in the same trains.

The device for holding the link up is useful for any coupling to which it is to be connected.

The coupling-pin may be withdrawn by means of a line or chain extending up from the pin to the top of the car, or it may lead over a pulley and extend to the side of the car.

Having thus described my invention, what I claim as new, and desire to secure by Letters Patent, is—

1. In a car-coupling, the draw-head A, in combination with the supplemental cap or attachment C and the double link M N, centrally united, substantially as herein described.

2. In a car-coupling, the attachment C, mounted above the draw-head A, and having the sliding pin-support G, the projecting arms I and J, and the weighted or spring lever K, substantially as and for the purpose herein described.

3. In a car-coupling, the two links M and N, having the jointed central uniting arm or connection O, in combination with the draw-head A and the superposed attachment C, substantially as herein described.

4. The double connected link M N of a car-coupling, with the extension P, projecting downward from the center of the lower link, so as to rest against the front of the draw-head and hold the links level, substantially as herein described.

In witness whereof I hereunto set my hand.

THERON A. SMITH.

Witnesses:
GEO. H. STRONG,
GEO. W. EMERSON.